Figures 1, 2:
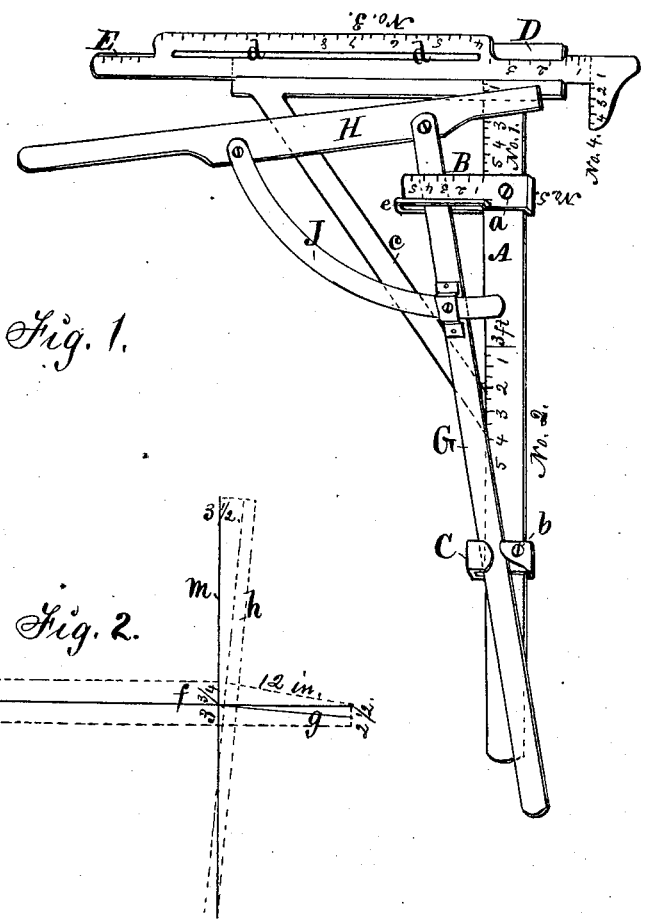

D. R. WINTER.
Gage for Shaping Wagon Axles.

No. 163,430. Patented May 18, 1875.

Witnesses.
E. P. Tilden
J. F. Whicher

Inventor,
Daniel R. Winter,
Thomas G. Orwig, Atty.

UNITED STATES PATENT OFFICE.

DANIEL R. WINTER, OF NEWTON, IOWA.

IMPROVEMENT IN GAGES FOR SHAPING WAGON-AXLES.

Specification forming part of Letters Patent 163,430, dated May 18, 1875; application filed December 1, 1874.

*To all whom it may concern:*

Be it known that I, DANIEL R. WINTER, of Newton, in the county of Jasper and State of Iowa, have invented an Improvement in Gages for Shaping Wagon-Axles and Setting Wheels, of which the following is a specification:

The object of my invention is to provide means by which the requisite angle of the axis of a spindle relative to the axis of the axle can be readily determined with mathematical precision.

It consists in a combination of adjustable gages and graduated scales or measures, and the method of using them, all as hereinafter fully set forth.

Figure 1 of my drawing is a perspective view illustrating the construction of my instrument.

A A is the base-piece in the form of a straight bar or rule. It should be fully half as long as the height or diameter of the carriage-wheel, for which an axle is to be properly formed. No. 1 is a scale or graduated measure on its right or lower end to determine the diameter of the hub of the wheel. B is a sliding bar and a gage on the bar A, which may be set at the point indicated as the diameter of the hub, and then rigidly locked by means of the set-screw $a$, carried by the slide B. No. 2 is a graduated scale at the top end of the bar A, by which the height or diameter of the wheel is determined. C is a sliding loop and gage that may be set at the point indicated as the diameter or height of the wheel, and then locked by the set-screw $b$ carried by the loop C. D is a bar rigidly attached, at right angles, at the right or lower end of the bar A, and forms a square therewith. $c$ is a bar forming a corner brace between the bars A and D. E is a bar and gage sliding longitudinally in suitable grooves or bearings fixed in or on the bar D. No. 3 is a graduated scale on the bar E to be adjusted and set relative to the length of the hub to determine the angle required in the spindle of the axle. $d\ d$ is a slot or line representing the edge of the short arm of the square A D. No. 4 is a scale running at right angles with the starting-point of scale No. 3, and is used to determine the drop or downward angle of the axis of the spindle, relative to the axis of the body of the axle. The bar E may be sufficiently wide for the length of the scale No. 4, or it may have a projection or arm to contain a part of the scale, and to form a shoulder opposite the starting-point of scale No. 3. G is an adjustable bar sliding in the loop $e$ on the gage B, and also in the combined loop and gage C. H is a bar and straight edge pivoted to the right and lower end of the adjustable bar G. J is a curved stay-bar pivoted to the straight edge H, and passed through a loop on the bar G, and secured thereto by means of a set-screw, and serves to change the angle of the straight edge relative to the bar G. The same result may be obtained by extending the bar G across the straight edge H, and fixing a set-screw beyond or outside of the pivotal point of their connection. No. 5 is a scale on the sliding bar and gage B, by means of which the bar G and its straight edge H are adjusted and fixed relative to each other and the dish of the wheel.

My instrument may be made of wood and other suitable material, and vary in size, weight, and style of finish. The scales may be stamped on the bars with dies, painted on or formed and attached in any suitable way.

Fig. 2 is a diagram illustrating the practical operation of my instrument.

$ff$ is a datum-line representing the axis of an axle. $g$ is the axis of a spindle twelve inches long, three and three-fourths inches in diameter at its large end at the shoulder of the axle, and two and a half inches at its small end. The form or outline of the spindle is indicated by broken lines. $h$ is a line representing the angle of the wheel relative to the perpendicular or plumb line $m$. The space between the tops of the lines $h$ and $m$ indicates the amount or measure of the swing secured to the wheel by the drop of the axis of the spindle relative to the axis of the carriage-axle. The inside edge of the bar A, containing scales Nos. 1 2, is the datum-line used in adjusting and operating the instrument. Lay the instrument on the wheel with the point of the square formed by the intersection of its datum-line and the slot $d\ d$ on the center of the hub. Move the gage B to the outside edge or largest diameter of the hub, and then fasten it with its screw $a$, and the sliding gage B will then be a fixed mark on the No. 1 scale, showing the diameter of the hub. Next move the sliding gage C to the outside edge of the rim of the wheel, and fasten it with the screw $b$, and it will be a fixed mark on scale No. 2, showing the height or diameter of the wheel. Next measure the length of the hub outside of its spokes, and move the sliding bar E, so that the measure will be marked on the scale No. 3 by the inside edge of the bar A, which edge is the datum-line of the instrument. Next lay a straight-edge across the wheel, and with one of the scales on the instrument, or any suitable graduated inch-measure, ascertain the dish of the wheel. Then move the bar G in the loop $e$ to a point on the scale No. 5, which will correspond with the measure of the dish of the wheel. Then, while holding the bar G rigidly, adjust the straight edge H to bring it in line with the line or slot $d\ d$, and lock it to the bar G with the provided setscrew. Then move the bar G, carrying the straight edge H, toward the datum-line until the straight edge reaches and marks the whole length of the spindle on the scale No. 3. This movement of the straight edge will mark the required amount of drop on scale No. 4 and correctly determine the angle of the axis of the spindle and wheel relative to the axis of the axle required to secure the necessary amount of swing for the wheels.

The measurements of the different parts, thus obtained by my instrument, secures a proper and proportionate amount of swing for all sizes of wheels and spindles, and axles may be readily marked off, as shown, by Fig. 2, by first marking the amount or measure of drop under the end of the datum-line $f\ f$, and the length of the spindle on the same line, and then drawing a line, $g$, between the two points to fix the required angle of the axis of the spindle relative to the axis of the axle.

After the required amount of swing has been established, as indicated, by the distance between the tops of the lines $h$ and $m$ in Fig. 2, a proportionate gather for the wheels may be determined and obtained by angling the axis of the spindle forward, relative to the axis of the axle. To do this mark $\frac{1}{3}$, $\frac{1}{4}$, $\frac{1}{5}$, or any chosen fraction of the drop in front of the end of the datum-line $f$ representing the axis of the axle, and draw a line from that point to the point of intersection between the lines $f$ and $g$.

I am aware that graduated scales have been combined with an adjustable stock to form an axle-gage; but I claim that my manner of forming, and method of using, an instrument having five different scales is new and greatly advantageous.

I claim as my invention—

1. The instrument composed of the bars A, B, D, E, G, and H, loops C and $e$, and graduated scales Nos. 1, 2, 3, 4, and 5, substantially as and for the purposes shown and described.

2. The method of ascertaining the required angle of the axis of a spindle, relative to the axis of a carriage-axle, substantially as set forth, and illustrated.

DANIEL R. WINTER.

Witnesses:
M. E. ORWIG,
J. K. MARSH.